March 11, 1941.  J. D. McINTOSH  2,234,602
CONNECTOR
Filed May 20, 1940
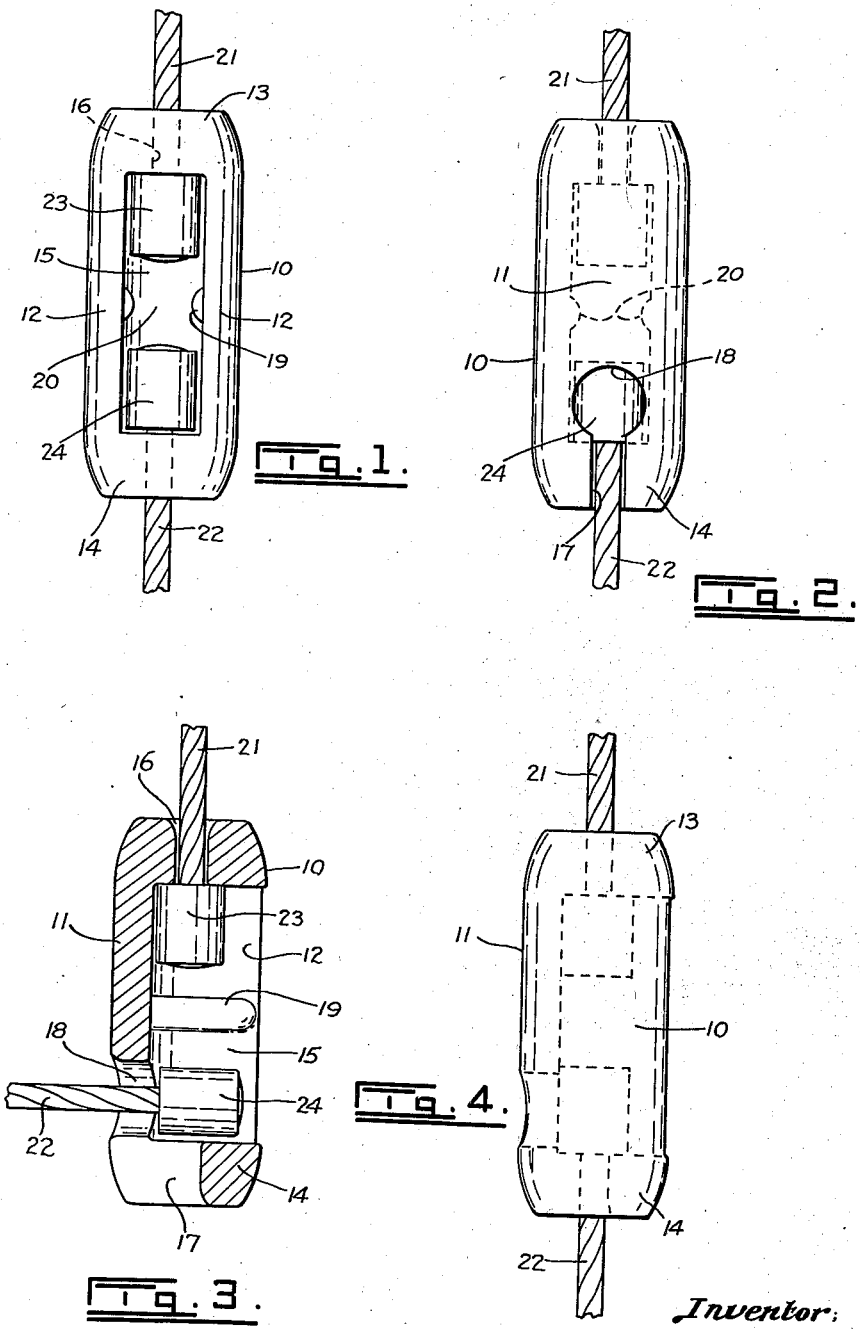
Inventor:
John David McIntosh, Deceased,
By, Nellie Emmeline McIntosh Extrx.
BY: Eugene E. Stevens
ATTORNEY Patented Mar. 11, 1941

2,234,602

UNITED STATES PATENT OFFICE 2,234,602

CONNECTOR

John David McIntosh, deceased, late of Simoon Sound, British Columbia, Canada, by Nellie Emmeline McIntosh, executrix, Simoon Sound, British Columbia, Canada Application May 20, 1940, Serial No. 336,309

4 Claims. (Cl. 24—123)

This invention relates to an improved connecting device for ropes, cables or the like.

An object of the present invention is the provision of a device for connecting two free cable or rope ends together in a rapid and efficient manner.

Another object is the provision of a device for removably connecting together two free cable or rope ends which are to be subject to relatively great and constant strain.

Another object is the provision of a device for removably connecting together two free cable ends about to be subjected to sudden strain without danger of either end accidently becoming free from the connector when the strain is applied.

A further object is the provision of a connector device of the type described of greater strength than the known connectors of the same relative size.

With these and other objects in view, the present invention consists essentially of a device for removably connecting two cable ends together, comprising a link, means for connecting one cable end to the link, a chamber formed in the link, an axial slot in the bottom of the link extending from substantially the centre thereof through the back of the link, an opening in the back of the link communicating with the chamber thereof and directly with the slot, and an enlarged ferrule on the other cable end, said ferrule being adapted to be inserted through the opening into the chamber, whereby any strain on the cables causes the second cable to swing into the axial slot with its ferrule resting on the bottom of the link, as more fully described in the following specification and illustrated in the accompanying drawing, in which Figure 1 is a front elevation of the connector with the cable ends in position, Figure 2 is a rear elevation of the device, Figure 3 is a vertical section through the connector, and Figure 4 is a side elevation thereof.

Referring more particularly to the drawing, the connector consists of a link 10 having a back 11, sides 12 and ends 13 and 14, said back, sides and ends forming therebetween a chamber 15 which preferably opens outwardly at the front of the connector, as shown.

An axial opening 16 is formed in and extends through the end 13 while an axial slot 17 is formed in and extends through the end 14. This slot extends from approximately the central point of the end 14 outwardly through the back 11.

An opening 18, preferably circular in shape, is formed in the back 11 just above the end 14, said opening communicating with the chamber 15 and directly with the slot 17.

A projection 19 is formed on the inner surface of one or both sides 12 approximately midway between the ends thereof, thus providing a restriction 20 therebetween.

The cable or rope ends 21 and 22 to be connected together, are provided with enlarged ferrules 23 and 24, respectively, which are preferably cylindrical in shape. The cable end 21 is threaded through the axial opening 16 and its ferrule 23 more or less remains permanently in the chamber 15 above the projections 19. Although this is a preferred method of connecting the cable 21 to the link, it will be understood that it may be connected thereto in any other desired manner. Both ferrules are wider or of greater diameter than the restriction 20 while the ferrule 21 should be just large enough in diameter to pass through the opening 18 when inserted lengthwise therethrough, said ferrule being longer than it is wide.

When it is desired to connect the cable ends 21 and 22 together, the ferrule 24 is inserted top first through the opening 18, see Figure 3, into the chamber 15 and then when either or both the cable ends are pulled axially, the cable end 22 swings into the axial slot 17, as in Figure 4, with the ferrule in the lower part of the chamber 15 and extending longitudinally of the link 10, at which time the inner end of this ferrule bears against the inner surface of the end 14 of the link. During this movement, the sides of the opening 18 act as a guideway to direct the cable end into the slot 17. When in this position, the ferrule 24 cannot move forwardly or, referring to Figure 4, to the right since the cable end 22 abuts against the inner end of the slot 17 and said ferrule cannot move rearwardly or to the left owing to the fact that it is longer than it is wide and, consequently, it is longer than the width of the opening 18. If the projections 19 are provided, they prevent the ferrules from moving towards each other sufficiently to permit the ferrule 23 to interfere with the other one.

Once the ferrule 24 has been inserted through and clears the opening 18 a sudden axial pull on either cable end cannot dislodge the ferrule because the first movement of the cable end 22 or of the link 10, causes the ferrule to assume a position at an angle to the opening 18 so that it is impossible for this ferrule to pass therethrough. It does not matter what happens to the ferrule during the first part of this movement, it cannot leave the link and, in fact, the only way to remove the ferrule is to get sufficient slack in the cable end to permit it to be moved to a position at right angles to the link, at which time the ferrule may be withdrawn through the opening 18 by pulling in a direction at right angles to the normal positions of the cable ends.

The design of this connector is such that the back 11 braces practically the entire link 10 and the sides and ends thereof may be made relatively thick without interfering with the operation of the device.

From the above, it will be seen that a device of relatively great strength has been provided for removably connecting two cable ends together in a rapid manner without fear that they might be accidently separated for any reason whatsoever.

Various modifications may be made in this invention without departing from the spirit thereof or the scope of the claims and, therefore, the exact forms shown are to be taken as illustrative only and not in a limiting sense, and it is desired that only such limitations shall be placed thereon as are disclosed in the prior art or are set forth in the accompanying claims.

The invention claimed is:

1. A device for removably connecting two cable ends together, comprising a link having a chamber formed therein, means for connecting one cable end to the link, the bottom of said link having an axial slot therein extending from substantially the centre thereof through the back of the link, said back having a circular opening therein communicating with the chamber thereof and directly with the slot, and an enlarged ferrule on the other cable end, said ferrule being slightly smaller than the diameter of the circular opening and longer than it is wide, whereby the ferrule may be inserted top first through the opening into the chamber and any strain on the cables causes the second cable to swing into the axial slot with its ferrule resting on the bottom of the link.

2. A device for removably connecting two cable ends together comprising a link having a chamber formed therein opening outwardly at the front thereof, a back covering the rear of the link, said link having a bottom with an axial slot formed therein extending from substantially the centre thereof through the back of the link, said back having a circular opening therein communicating with the chamber and directly with the slot, and an enlarged cylindrical ferrule on the other cable end, said ferrule being slightly smaller than the diameter of the circular opening and longer than it is wide, whereby the ferrule may be inserted top first through the opening into the chamber and any strain on the cables causes the second cable to swing into the axial slot with its ferrule resting on the bottom of the link.

3. A device for removably connecting two cable ends together, comprising a link having a chamber formed therein, one end of said link having an axial opening therein through which one cable is threaded, an enlarged ferrule on the cable end in the chamber, the bottom of said link having an axial slot therein extending from substantially the centre thereof through the back of the link, said back having a circular opening therein communicating with the chamber thereof and directly with the slot, and an enlarged cylindrical ferrule on the other cable end, said ferrule being slightly smaller than the diameter of the circular opening and longer than it is wide, whereby the ferrule may be inserted top first through the opening into the chamber and any strain on the cables causes the second cable to swing into the axial slot with its ferrule resting on the bottom of the link.

4. A device for removably connecting two cable ends together, comprising a link having a chamber formed therein, one end of said link having an axial opening therein through which one cable is threaded, an enlarged ferrule on the cable end in the chamber, at least one projection on the wall of the link beyond said ferrule, the bottom of said link having an axial slot therein extending from substantially the centre thereof through the back of the link, said back having a circular opening therein on the side of the projection remote from the abovementioned ferrule, said opening communicating with the chamber and directly with the slot, and an enlarged cylindrical ferrule on the other cable end, said ferrule being slightly smaller than the diameter of the circular opening and longer than it is wide, whereby the ferrule may be inserted top first through the opening into the chamber and any strain on the cables causes the second cable to swing into the axial slot with its ferrule resting on the bottom of the link.

NELLIE EMMELINE McINTOSH,
*Executrix of the Last Will and Testament of John David McIntosh, Deceased.*